United States Patent
Thurmeier (10) Patent No.: US 11,211,660 B2
(45) Date of Patent: Dec. 28, 2021

(54) BATTERY FOR AN ELECTRIC DRIVE OF A MOTOR VEHICLE

(71) Applicant: AUDI AG, Ingolstadt (DE)

(72) Inventor: Markus Thurmeier, Adlkofen (DE)

(73) Assignee: AUDI AG, Ingolstadt (DE)

( * ) Notice: Subject to any disclaimer, the term of this patent is extended or adjusted under 35 U.S.C. 154(b) by 82 days.

(21) Appl. No.: 16/628,428

(22) PCT Filed: Jun. 25, 2018

(86) PCT No.: PCT/EP2018/066920
§ 371 (c)(1),
(2) Date: Jan. 3, 2020

(87) PCT Pub. No.: WO2019/007734
PCT Pub. Date: Jan. 10, 2019

(65) Prior Publication Data
US 2020/0220129 A1 Jul. 9, 2020

(30) Foreign Application Priority Data
Jul. 4, 2017 (DE) ...................... 10 2017 211 366.9

(51) Int. Cl.
*B60K 1/04* (2019.01)
*H01M 50/20* (2021.01)
*H01M 50/24* (2021.01)

(52) U.S. Cl.
CPC .............. *H01M 50/20* (2021.01); *B60K 1/04* (2013.01); *H01M 50/24* (2021.01); *B60K 2001/0411* (2013.01); *H01M 2220/20* (2013.01)

(58) Field of Classification Search
CPC .................................. B60K 1/04; H01M 50/20
See application file for complete search history.

(56) References Cited

U.S. PATENT DOCUMENTS

| 8,551,640 | B2 * | 10/2013 | Hedrich | ............... | H01M 10/625 |
| | | | | | 429/161 |
| 9,564,663 | B2 * | 2/2017 | Kim | ...................... | H01M 50/20 |

(Continued)

FOREIGN PATENT DOCUMENTS

| DE | 102011087003 A1 | 5/2013 |
| DE | 102012015919 A1 | 2/2014 |

(Continued)

OTHER PUBLICATIONS

German Examination Report dated Apr. 16, 2018 in corresponding German Application No. 10 2017 211 366.9; 20 pages; Machine translation attached.

(Continued)

*Primary Examiner* — Jonathan Ng
*Assistant Examiner* — James J Triggs
(74) *Attorney, Agent, or Firm* — Maier & Maier, PLLC (57) ABSTRACT

A battery for an electric drive of a motor vehicle, having a number of battery modules, which are arranged one above the other in the respective layers and accommodated in an assigned housing. The battery is optimized regarding production engineering aspects, and is also optimized regarding the requirements of tightness and accident properties, each of the layers of the battery modules arranged one above the other is accommodated in a respectively assigned, separate battery housing, which are arranged one above the other in a stack and connected to one another.

16 Claims, 5 Drawing Sheets

(56) References Cited

U.S. PATENT DOCUMENTS

2008/0050645 A1   2/2008  Kai et al.
2012/0251863 A1  10/2012  Berger et al.
2013/0316212 A1  11/2013  Lee et al.
2014/0227577 A1   8/2014  Lee et al.

FOREIGN PATENT DOCUMENTS

DE    102013106433 A1  12/2014
DE    102015014033 A1   4/2016
JP         2013145649 A   7/2013
WO         2016182170 A1  11/2016

OTHER PUBLICATIONS

International Search Report dated Nov. 15, 2018 and Written Opinion in corresponding International Application No. PCT/EP2018/066920; 19 pages; Machine translation attached.
English-language translation of International Preliminary Report on Patentability dated Jan. 16, 2020, in the corresponding International Application No. PCT/EP2018/066920; 7 pages.

* cited by examiner

BATTERY FOR AN ELECTRIC DRIVE OF A MOTOR VEHICLE

FIELD

The disclosure relates to a battery for an electric drive of a motor vehicle. Furthermore, the invention relates to a battery housing for such a battery and a motor vehicle having such a battery.

BACKGROUND

The vast majority of batteries for the electric drives of motor vehicles are now installed in the underfloor area of the passenger compartment. The examples of such installation methods can be found in DE 10 2012 015 919 A1 and DE 10 2015 014 033 A1, in which the respective battery modules, which themselves respectively comprise a number of interconnected battery cells, are arranged in a layer or plane and accommodated in a battery housing. These known constructions are extremely expensive, not least because of the required active cooling with a refrigerant. In addition, the considerable dimensions of the battery impose restrictions regarding construction and manufacturing technology, since the battery housings are usually relatively difficult to seal.

From DE 10 2013 106 433 A1, a generic battery can already be found to be known, in which two battery modules, where usually, respectively a number of interconnected battery cells are combined, are arranged one above the other in different layers in the vertical direction of the motor vehicle. The two battery modules are accommodated in a common battery housing, which extends over the height of both layers of battery modules. Between the two battery modules, there is also a stiffening element, for example, in the form of a horizontal intermediate plate or intermediate plane, which connects the respective mutually opposite housing parts to one another and hereby should facilitate a block formation of the battery housing in the event of a collision in the front area.

In order to design such a battery housing for battery modules arranged one above the other in an appropriate tight manner in several layers or in order to give it sufficient stability and rigidity regarding an accident-related application of force, however, considerable constructive and accordingly expensive measures are required. In addition, in the event of an accident-related application of force, the tightness of the battery housing can only be guaranteed with great constructive effort.

SUMMARY

The object of the present invention is thus to create a battery or a battery housing and a motor vehicle having such a battery which are optimized on the one hand regarding manufacturing technology aspects, and on the other hand also regarding the requirements of tightness and accident properties.

According to the invention, this object is achieved by a battery or a battery housing and a motor vehicle having such a battery.

The battery according to the invention is characterized in that a number of battery modules, which respectively comprise a number of interconnected battery cells, are arranged one above the other in at least two layers in the vertical direction of the motor vehicle. This arrangement initially enables a space-saving design of a battery, so that it can be installed in particular, but not exclusively, in the front area or in the area of the front structure/crumple zone of a motor vehicle.

There, according to the invention, it is provided that each of the layers of the battery modules arranged one above the other is accommodated in a respectively assigned, separate battery housing, which are arranged one above the other in a stack and are interconnected. In contrast to the prior art, in particular according to DE 10 2013 106 433 A1, it is thus provided according to the invention that each layer of the battery modules is accommodated in a battery housing that can be manufactured separately. This offers the considerable advantage that such a battery housing can be manufactured extremely inexpensively, since it is designed to be significantly smaller when compared with the prior art. Each of these battery housings can preferably be designed at least essentially as the same part, which significantly simplifies manufacturing. The number of battery housings used in each case, which corresponds to the number of the layers of the battery modules, can then be arranged stacked one above the other, wherein, for example, the respective adjacent battery housings are interconnected via appropriate connecting elements. In this context, also it is natural to think that the non-adjacent battery housings are also interconnected. The particular advantages of this simple construction of the respective battery housings result not only in the simple manufacture, but also in the correspondingly simple possibility, in achieving an appropriate tightness, and also as a result of the greater variability in the arrangement of the battery housings one above the other, regarding the accident behavior. There, the stack of battery housings can be made extremely shear-resistant by suitable measures.

The battery can be used both in a purely electrically powered motor vehicle and in a hybrid vehicle. If necessary, several batteries can also be installed for driving within a motor vehicle.

In this context, it has proven to be further advantageous if the stack of battery housings is designed tight. Depending on the design of the battery housing, in the simplest case this can be done by designing each of these battery housings sealed. On the other hand, for example, if implementing openings are provided within the respective battery housings, for example, in order to interconnect the battery modules of different layers within the respective battery housings, so the battery housings can also be sealed against one another in a simple manner. Since the predominant seal—with the exception of the possibly available implementing openings—can be made for each battery housing, this is much easier than with large battery housings according to the prior art.

In a further design of the invention, the stack of battery housings is surrounded by a protective housing of the battery. This protective housing does not have to be suitably closed, since it preferably has no sealing function, but can also be partially open. Since such a sealing function is preferably not necessary, the protective housing can be designed in an appropriate simple manner and can be optimized in particular concerning the stability and rigidity of the battery, in particular regarding its accident behavior. For this purpose, the protective housing can be at least partially formed of appropriate side walls or similar elements, which have an appropriate absorption capacity for accident energy. In an alternative embodiment, however, it would also be theoretically conceivable to design a protective housing of this type.

Another advantageous embodiment of the invention provides that at least a number of battery housings stacked one above the other—at least essentially—are designed identical in shape. Being identical in shape is in particular to be understood that all battery housings or their respective components, for example injection mold, can be manufactured in the same shape. Thus, the cost of the battery can be significantly reduced due to the identical parts.

Another advantageous embodiment of the invention provides that each battery housing is formed of plastic, in particular fiber-reinforced plastic. A battery housing made of such plastic is inexpensive and easy to manufacture, and furthermore appropriate functional elements for stiffening, for the connection to other components or the like, can be preformed onto this in a simple manner.

In another embodiment of the invention, it has been shown to be advantageous if each battery housing has a rigid structure and/or plug-in connector elements for connecting the battery housing to each adjacent battery housing. Here, it is naturally particularly advantageous if such functional elements can be preformed onto a plastic battery housing. Due to the rigid structure, the rigidity and stability of the battery can thus be set particularly favorably overall. The plug-in connector elements can be used for the correct assembly of the battery housings to one another or for the manufacture of the respective shear-resistant connections.

Another advantageous embodiment of the invention is characterized in that the battery housing has at least one implementing opening, whose edge area is sealed with a sealing arrangement against the edge area of an implementing opening of the adjacent battery housing. In this way, an implementation for lines or the like can be created in a simple manner through the entire stack of battery housings. A connection channel created in this way and integrated into the battery enables a particularly simple, self-contained and tightly designed battery, in which the respective layers of battery modules are interconnected in a simple manner.

Finally, it has proven to be advantageous if each battery housing has associated fastening elements for fastening the respective side walls or similar protective elements of the protective housing of the battery. Thus, the side walls or similar protective elements can be attached to the battery in a particularly simple manner.

The advantages described above in the context of the battery according to the invention also apply to the battery housing according to the invention according to claim 9 and to the motor vehicle according to claim 10.

BRIEF DESCRIPTION OF THE DRAWING

The exemplary embodiments of the invention are described below. For this shows.

DETAILED DESCRIPTION

The exemplary embodiments explained in the following are preferred embodiments of the invention. In the exemplary embodiments, the described components of the embodiments respectively present individual features of the invention that are to be considered independent of one another, which also respectively further develop the invention independently of one another and are thus also to be regarded individually or in a combination other than that shown as a component of the invention. Furthermore, the described embodiments can also be supplemented by further features of the invention that have already been described.

In the figures, elements with the same function are provided with the same reference numbers, respectively.

Figure 1:
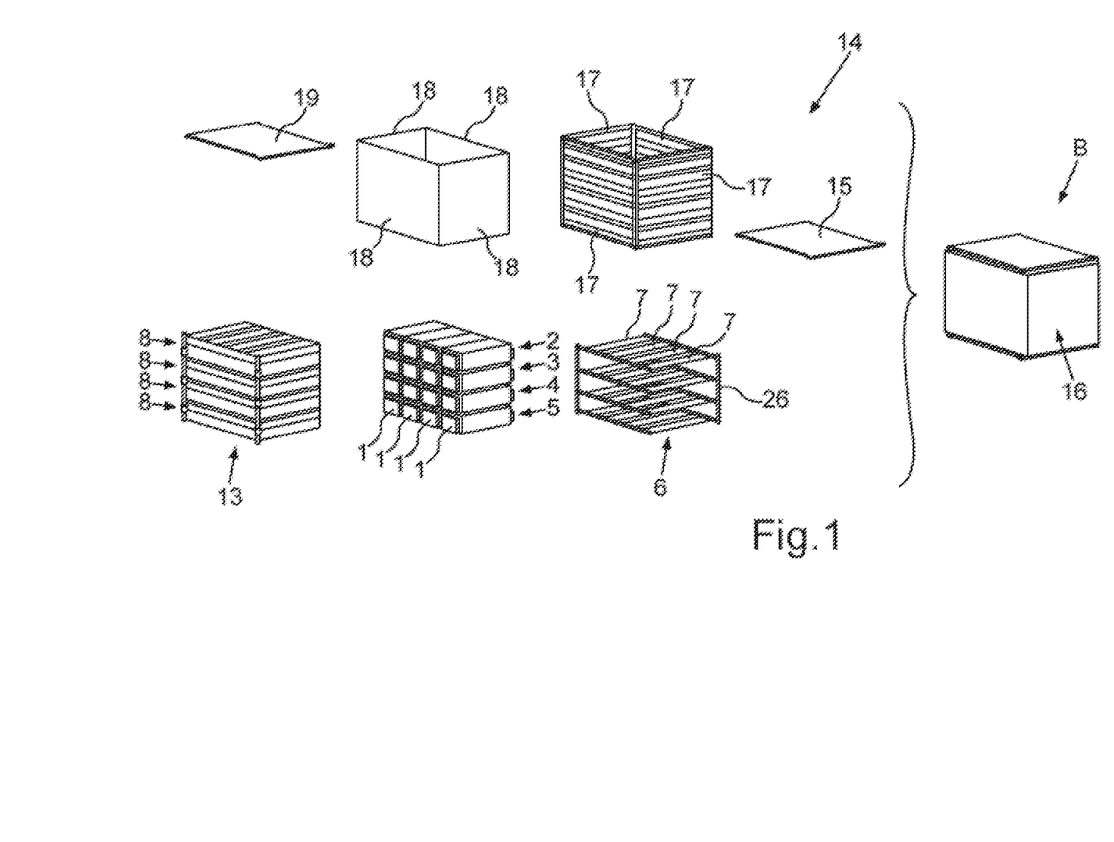
FIG. 1 a perspective exploded view of the essential components of the battery according to the invention, according to an advantageous embodiment, FIG. 2 a schematic and partial sectional view of the battery installed in the front of a motor vehicle according to an advantageous embodiment, FIG. 3 a perspective view of a base element and a cover element of one of the battery housings of the battery according to the invention, FIG. 4 respectively, perspective views of the battery according to an advantageous embodiment, where a number of battery housings, in which respectively a number of battery modules are accommodated, is arranged in a stack one above the other and connected to one another, FIG. 5 a sectional view through the stack of battery housing of a battery, arranged one above the other, according to an advantageous embodiment, FIG. 6 a partial and enlarged, schematic sectional view of a base element and a cover element of battery housing, respectively arranged one above the other, wherein each of the components comprises respective plug-in connector elements by means of which the adjacent battery housings can be positioned relative to one another and can be mutually supported in the pushing direction, FIG. 7 a partial and enlarged sectional view of the respective, mutually adjacent battery housings in the region of a connecting element, by means of which, on the one hand, a battery module can be fixed within the associated battery housing and, on the other hand, the battery housing can be connected to the adjacent battery housing arranged underneath, FIG. 8 a perspective view of the base plate of a protective housing of the stack of battery housings, in the corner area of which respective connecting rods are provided for holding the stack of the battery housing or the protective housing, FIG. 9 a perspective view and a sectional view of a protective housing, within which the stack of battery housings is accommodated.

In FIG. 1, in a perspective exploded view, the essential components of the battery B that is additionally shown assembled can be seen on the right hand in a schematic perspective view. Here, the battery B initially comprises a number of battery modules 1, four pieces of which, in the present case, for example, are respectively arranged in a corresponding position 2, 3, 4, 5 side by side in a horizontal plane or in the vertical direction of the motor vehicle at a common height. In other words, presently, the respective four battery modules 1 are arranged at the same height or within a corresponding position 2, 3, 4, 5, wherein the majority of these layers 2, 3, 4, 5 are arranged one above the other in a manner described in more detail below. Each battery module 1 is formed by a multiplicity of battery cells interconnected parallel and/or in series. The output voltage of each battery module 1 is accordingly correspondingly greater than the output voltage of the respective number of associated battery cells. The output voltage of the entire battery B is accordingly greater than that of the respective battery modules 1, which are interconnected accordingly.

Furthermore, the battery B comprises the cooling device 6 that is described in more detail below, within which a coolant circulates. The cooling device 6 comprises a number of flat cooling elements or cooling lines 7, four of which respectively run on a common level or in one level. The cooling elements or cooling lines 7 run there in a manner described in more detail below, respectively on the underside of the associated battery module 1 or on the underside of each layer 2, 3, 4, 5 of battery modules 1.

Figure 3:
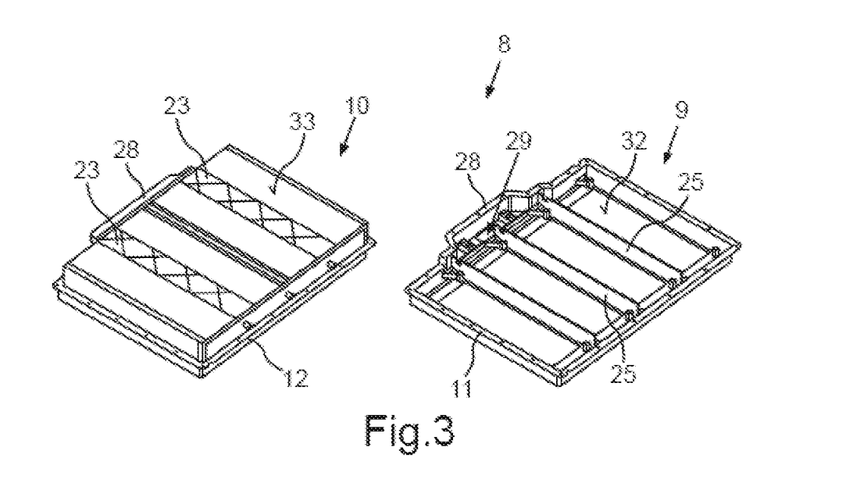

Each layer 2, 3, 4, 5 of battery modules 1 is accommodated within a respectively assigned battery housing 8, as shown in one of those in FIG. 3, respectively in a perspective view of the base element 9 and the cover element 10 of the battery housing 8. The base element 9 and the associated cover element 10 are closed after being fitted with the respectively associated four battery modules 1 of the corresponding layer 2, 3, 4, 5 in the area of respectively, mutually assigned flanges 11, 12 by means of a seal that is no longer visible. In the present case, since the four layers 2, 3, 4, 5 of battery modules 1 are provided, accordingly, the corresponding four battery housings 8 are arranged one above the other in the stack 13 that can be seen in FIG. 1. There, the respective battery housings 8 are mutually positioned and interconnected in a manner described in the following.

The stack 13 of the battery housing 8 having the cooling device 6 is accommodated in a protective housing 14, which is also shown explosively in FIG. 1. This protective housing 14 initially comprises a base 15 and respective four side walls 16, which are presently each composed of two parts or layers 17 and 18. In the present case, these two parts are, for example, a corrugated metal sheet 17 and an associated locking plate 18, in order to achieve a good energy absorbing, multi-layer component, respectively. In addition, the protective housing 14 comprises cover 19, so that the stack of battery housings 8 is completely enclosed by the protective housing 14 in the present case. Here, the protective housing 14 is also referred to as a crash tank and can be seen again in an assembled form in a corresponding perspective view in FIG. 1 on the right hand.

Figure 2:
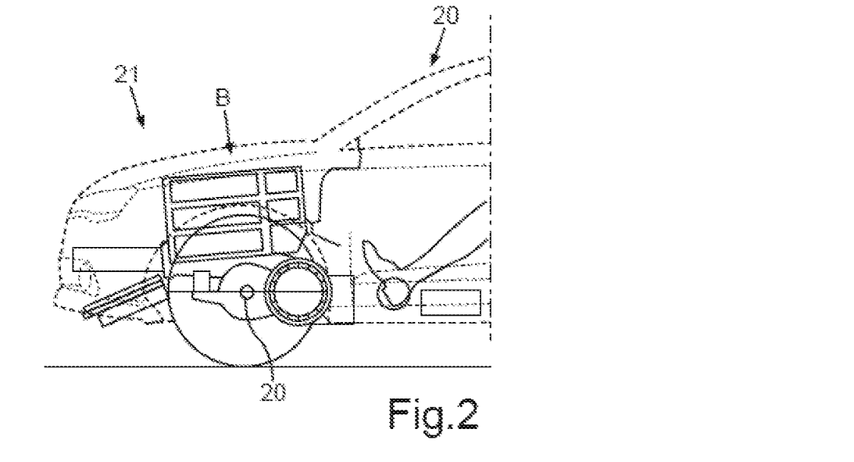

FIG. 2 shows, in a schematic sectional view, the front end 21 arranged in front of a passenger compartment 20 or a front structure/crumple zone of a passenger car, in the area where the battery B is arranged. There, the battery B is held at a level above a front axle 20 of the motor vehicle, in an otherwise not recognizable manner, on appropriate components of the body or on subframe elements, which are attached to the body shell. Here, the battery B is integrated into the crash systems of the vehicle.

From FIG. 2, it is particularly clear that the battery B installed in the front end 21 can be installed through the very good location analogous to an internal combustion engine or instead of it. Due to the high construction of the battery B having the multiple layers 2, 3, 4, 5 of battery modules 1 in the corresponding battery housings 8 and their arrangement one above the other to form the stack 13, there is the possibility of using the installation space in an optimal way, which is used by motor vehicles having internal combustion engines. The stack 13 of the battery housing 8 is optimally protected by the protective housing 14.

Each battery housing 8 or its individual parts, in the present case, the base element 9 and the cover element 10, is made of plastic, in particular fiber-reinforced plastic, formed and manufactured, for example, in an injection molding process. The use of plastic has the advantage of simple and inexpensive manufacture of the battery housing formed identically in shape, and functional elements such as elements/ribs of a rigid structure 23 and/or plug-in connector elements 24 (FIG. 6) are provided for connecting the battery housing 8 to the adjacent battery housing 8 in a simple manner. In addition, plastic is particularly suitable, in order to integrate reinforcing elements such as inserts, screw sleeves or the like or also functional elements of the cooling device 6, into each battery housing.

Figure 6:
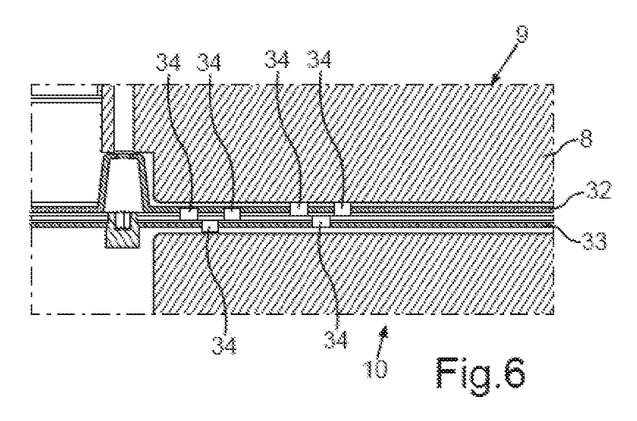

The rigid structure 23 having the ribs is provided in particular for appropriate loading conditions in the event of an accident-related application of force. The flanges 11, 12 of the base and cover elements 9, 10 are formed, for example, in standard geometry and connected to one another by means of screws.

Furthermore, it can be seen from FIG. 3 that the compartments within the base and cover elements 9, 10 are divided by each bar 25, within which the respective battery modules 1 are accommodated.

Figure 4:
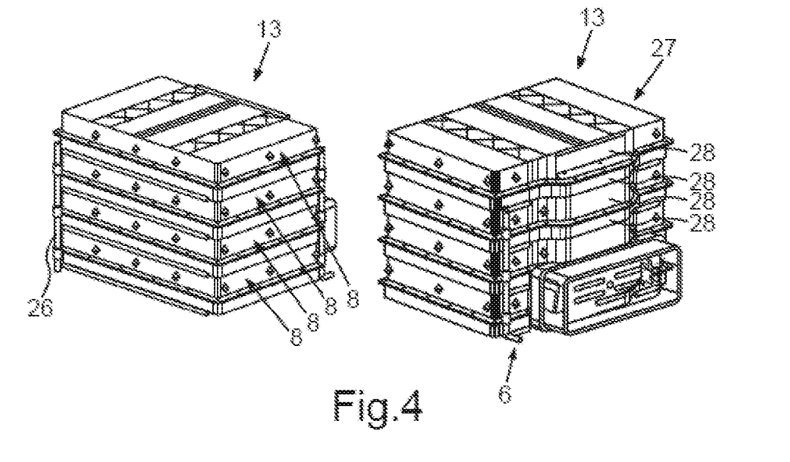

FIG. 4 shows, in two respective perspective views, presently the number of four battery housings 8, in which respectively a number of battery modules 1 are accommodated, and which are arranged one above the other in the stack 13 and interconnected. In addition, presently, the partial integration of the cooling device 6 into the stack 13 of the battery housing 8 can be seen. Here, the flat cooling lines or cooling elements 7 are arranged on the underside of each battery housing 8 or between two battery housings 8 adjacent to one another. There, the individual cooling elements 7 are connected via supply lines 26, which presently run, for example, in the corner region of the stack 13. The supply lines 26 designed as risers have chokes presently. In addition, the plug-in connectors between the components of the cooling device 6 are optimized regarding the flow resistance.

On its rear side, the stack 13 of battery housings 8 has a continuous channel 27, which interconnects the interior of each battery housing 8. This is formed in the base and cover elements 9, 10 of each battery housing 8 by the end wall 28 that is seen in FIG. 3, wherein an implementing opening 29 is also formed in each base and cover element 9, 10, via which the channel 27 is formed.

Figure 5:
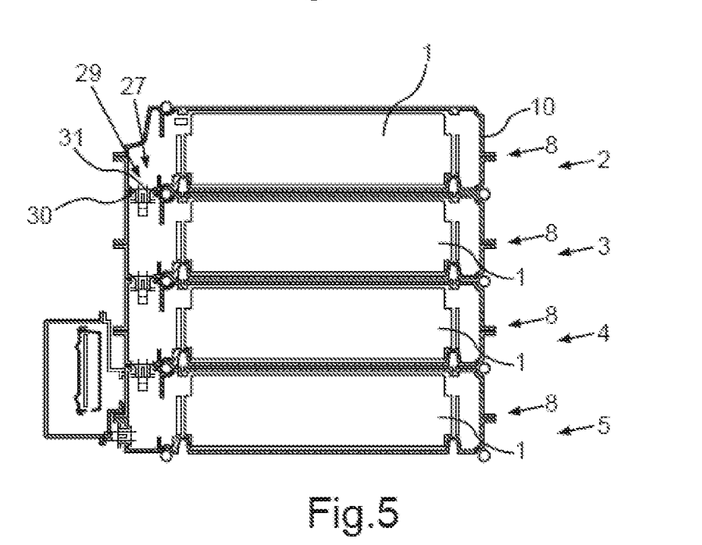

Thus, the entire stack 13 of the battery housing 8 is nevertheless leakproof,—as can be seen from the sectional view through the stack 13 according to FIG. 5,—between the edge region 30 of the implementing opening 29 of the battery housing 8 and the edge region 30 of the implementing opening 29 of the adjacent battery housing 8, a seal 31 is provided. This seal 31 can, for example, by means of a screw-in or push-in sleeve, be formed by the respective implementing openings 29 or by a seal, which is inserted between the battery housings 8. In any case, it should be achieved that the edge region 30 of the implementing opening 29 of a battery housing 8 is sealed with the seal 31 against the edge area 30 of the implementing opening 29 of the adjacent battery housing 8.

In particular, the respective layers 2, 3, 4, 5 of battery modules 1 are interconnected via the channel 27. Here, for example, a strip-like or rod-like conductor can run within the channel 27. The implementing openings 29 that are not required, for example, on the underside of the lowermost or on the upper side of the uppermost battery housing 8 of the stack 13, can be closed, for example, by a stopper.

FIG. 6 shows, in a partial, enlarged, and schematic sectional view, the base element 9 of one of the battery housings 8, which rests with a base plate 32 on a cover plate 33 of the battery housing 8 arranged underneath. From the base plate 32, plug-in connector elements 34 that are indicated by way of example, project downwards, which work together with other plug-in connector elements 34 projecting upward from the cover plate 33 in such a way that the adjacent battery cases 8 are connected and positioned relative to one another. In this way, for example, the assembly of the stack 13 of the battery housing 8 can be greatly facilitated. In addition, forces, in particular pushing forces, can be transmitted via the plug-in connector elements 34 in the event of an accident-related application of force between the adjacent battery housings 8. Due to the shear resistant connection of the battery housing 8, the rigidity of the battery B can thus considerably be improved in this way. The plug-in connector elements 34 can be, for example, latches, blockers, domes, clips or the like.

Figure 7:
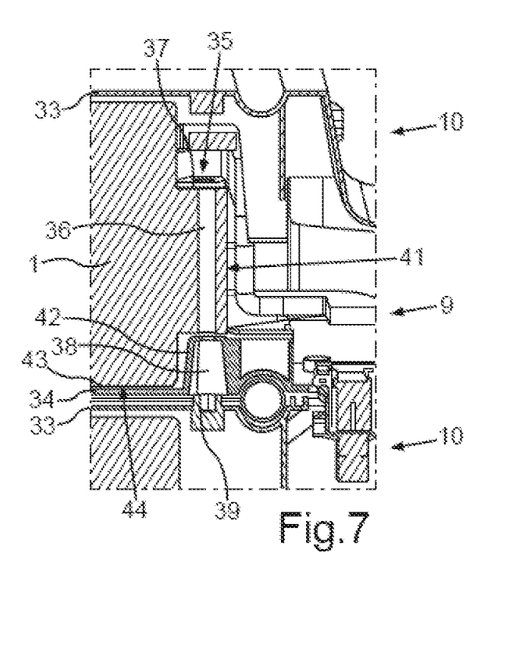

In FIG. 7, in a partial and enlarged sectional view, two mutually adjacent battery housings 8 are shown in the area of a connecting element 35. The connecting element 35 comprises a sleeve 36, which passes through each battery module 1 near its end face running in the vertical direction of the battery B. A screw element that is not visible runs inside the sleeve 36, which is supported by a head on top of the sleeve 36 on the plate 37 of the battery module 1, which is firmly connected to the sleeve 36. On the underside, the sleeve 36 or the battery module 1 is seated on the dome part 38, which is accommodated in an identically shaped receptacle 42 in the plastic of the base plate 32 of the base element 9.

A screw sleeve 39 adjoins downwards, which is firmly integrated into the plastic of the cover plate 33 of the cover element 10 or is injected presently. The screw element described above is screwed into said screw sleeve 39. When tightening the screw element, here the battery module 1 is braced downwards against the base element 9 and against the dome part 38, which in turn is supported by the cover plate 33 of the cover element 10 of the battery housing 8 underneath. Here, the cover element 10 and the battery module 1 are centered and fixed relative to the cover plate 33 of the cover element 10 of the battery housing 8 underneath, by means of the dome part 38.

In order to avoid a double fit, here a free space 43 is provided between the underside 44 of the battery module 1 and the bottom plate 32 of the bottom element 9, which is, for example, filled with a filler. By tightening the screw element, the battery module 1 is thus braced to the base element 9 and also to the cover element 10. In the present case, two connecting elements 35 are provided respectively for end face 41 of each battery module 1, that is to say, presently a total of four connecting elements 35 per battery module 1, and 16 connecting elements 35 per layer 2, 3, 4, 5 of battery modules 1. However, it is clear that depending on the implementation, this number, which depends, for example, on the number of layers 2, 3, 4, 5 or the size of the individual battery housing 8, may vary.

Figure 8:
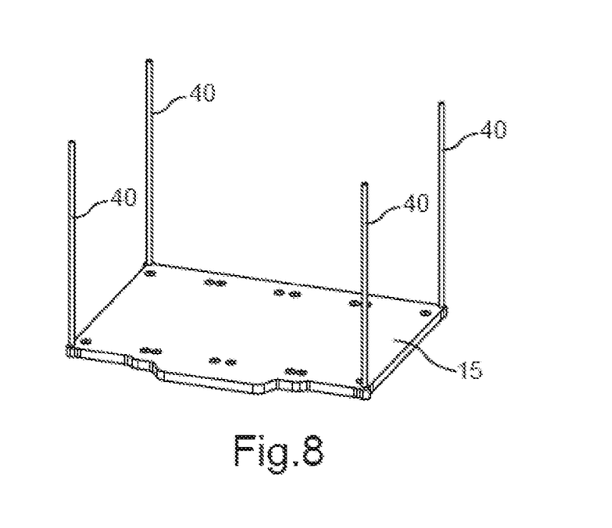

FIG. 8 shows a perspective view of the base plate or the bottom 15 of the protective housing 14, by means of which the stack 13 of battery housings 8 is enclosed. In the corner areas of the base plate 15, the respective connecting rods 40 running in the vertical direction of the motor vehicle, are provided for holding the stack 13 of the battery housing 8 or the protective housing 14. The connecting rods 40 can also be used to install or remove the battery B, for example, by screwing crane loops on the top. Thus, the battery B, including its protective housing 14, can be removed from the motor vehicle or installed. In addition, the respectively screw sleeves 39 or threaded holes are integrated into the base plate 15, which take over the function described above in the context of FIG. 7 for holding the floor element 9 arranged above it or the battery modules 1 accommodated by its battery housing 8.

Figure 9:
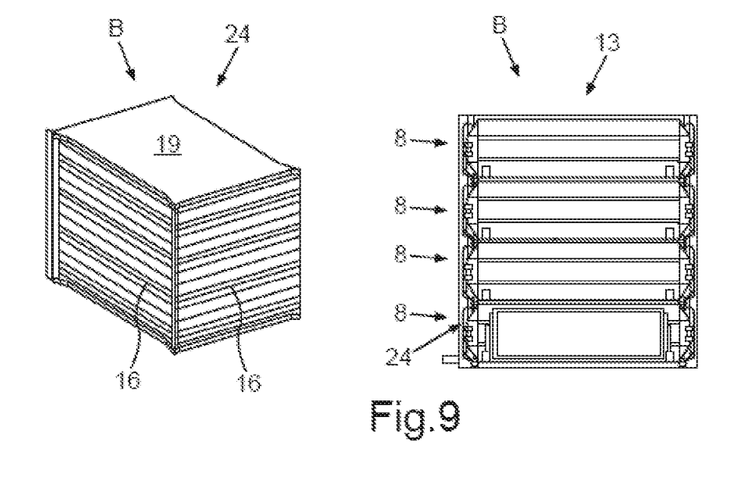

Finally, FIG. 9 shows a perspective view and a sectional view of the protective housing 14, within which the stack 13 of battery housings is accommodated. There, the four side walls 16 are particularly recognizable, which are presently formed of the corrugated metal sheet 17 arranged inside and the flat locking plate 18 arranged outside, in order to form a good energy absorbing, multilayer component. In addition, the cover 19 of the protective housing 14 can also be seen.

Like the base 15, this is also formed, for example, of a metal material such as a sheet metal.

The side walls 16 or their respective components 17, 18 are presently made of aluminum or steel alloy-based metal sheet and are mitred, for example, in the corners. In the corners, strips or the like can also be used as load distributors. For pre-assembly, the side walls 16 can be pre-attached to the stack 13 of the battery housing 8, in particular to the fastening elements not visible, for example, locking pins or the like, which, for example, are preformed onto the respective battery housings 8 in plastic or are arranged in that way. Hereby, the side walls 14 and optionally also the cover 19 can first be attached to the stack 13 and then connected to one another. By means of the connecting rods 40 already described in the context of FIG. 8, the components 15, 16 and 19 of the protective housing 14 can additionally be braced to one another. In addition, the battery housings 8 arranged one above the other in the stack 13 can be braced to one another via the connecting rods 40.

It is clear that the protective housing 14 can also be formed with other plate elements of various materials and in different designs.

The invention claimed is:

1. A battery for an electric drive of a motor vehicle, comprising:
   a plurality of battery modules, each of which are arranged one above the other in layers and each of which are accommodated in an assigned, separate battery housing,
   wherein each of the layers are arranged in a stack and connected to one another, and
   wherein each battery housing has at least one implementing opening whose edge area is sealed with a seal against an edge area of an implementing opening of an adjacent battery housing.

2. The battery according to claim 1, wherein adjacent battery housings are rigidly connected to each other.

3. The battery according to claim 1, wherein the stack of battery housings is accommodated in a protective housing of the battery.

4. The battery according to claim 1, wherein at least two of the battery housings are formed in an identical shape.

5. The battery according to claim 1, wherein each battery housing is formed of plastic, and
   wherein each battery housing is designed with two shells having a base element and a cover element.

6. The battery according to claim 1, wherein each battery housing has a rigid structure and plug-in connector elements for connecting adjacent battery housings.

7. The battery according to claim 1, wherein each battery housing has associated fastening elements for fastening respective side walls of a protective housing of the battery.

8. A battery housing for a battery according to claim 1.

9. A battery for an electric drive of a motor vehicle, comprising:
   a plurality of battery modules, each of which are arranged one above the other in layers and each of which are accommodated in an assigned, separate battery housing,
   wherein each of the layers are arranged in a stack and connected to one another, and
   wherein each battery housing has associated fastening elements for fastening respective side walls of a protective housing of the battery.

10. The battery according to claim 9, wherein adjacent battery housings are rigidly connected to each other.

11. The battery according to claim 9, wherein the stack of battery housings is accommodated in a protective housing of the battery.

12. The battery according to claim 9, wherein at least two of the battery housings are formed in an identical shape.

13. The battery according to claim 9, wherein each battery housing is formed of plastic, and
   wherein each battery housing is designed with two shells having a base element and a cover element.

14. The battery according to claim 9, wherein each battery housing has a rigid structure and plug-in connector elements for connecting adjacent battery housings.

15. The battery according to claim 9, wherein each battery housing has at least one implementing opening whose edge area is sealed with a seal against an edge area of an implementing opening of an adjacent battery housing.

16. A battery housing for a battery according to claim 9.

\* \* \* \* \*